United States Patent [19]

Reidinger

[11] Patent Number: 4,569,571

[45] Date of Patent: Feb. 11, 1986

[54] AMPLIFIER ASSEMBLY FOR ELECTROMAGNETIC RADIATION, PREFERABLY IN THE ACTINIC SPECTRUM

[75] Inventor: Michael J. Reidinger, New York, N.Y.

[73] Assignee: Tru-Lyte Systems, Inc.

[21] Appl. No.: 538,797

[22] Filed: Oct. 4, 1983

[51] Int. Cl.[4] .......................... G02B 6/04; H01J 29/10
[52] U.S. Cl. ................. 350/96.24; 313/475; 350/96.10; 350/96.27; 350/96.28
[58] Field of Search .............. 313/475; 350/96.10, 350/96.24, 96.25, 96.27, 96.28

[56] References Cited

U.S. PATENT DOCUMENTS

| | | | |
|---|---|---|---|
| 2,354,591 | 7/1944 | Goldsmith | 350/96.27 X |
| 4,240,692 | 12/1980 | Winston | 350/96.10 |
| 4,307,936 | 12/1981 | Ochiai | 350/96.24 |

FOREIGN PATENT DOCUMENTS

| | | | |
|---|---|---|---|
| 2523496 | 12/1976 | Fed. Rep. of Germany ... | 350/96.24 |
| 2488709 | 2/1982 | France | 350/96.24 |
| 56-83705 | 7/1981 | Japan | 350/96.24 |

*Primary Examiner*—John Lee
*Attorney, Agent, or Firm*—Louis E. Marn

[57] ABSTRACT

There is disclosed a novel light transmitting assembly comprised of a screen assembly having a plurality of generally conically-shaped repeater orifices wherein an optical fiber of an optical fiber bundle is disposed within each repeater orifice and wherein the repeater orifices are enclosed with an optical fiber array disc and wherein the optical fiber bundle is positioned between the screen assembly and a frame member for displaying thereon electromagnetic radiation preferably in the actinic range.

17 Claims, 7 Drawing Figures

AMPLIFIER ASSEMBLY FOR ELECTROMAGNETIC RADIATION, PREFERABLY IN THE ACTINIC SPECTRUM

FIELD OF THE INVENTION

This invention relates to transmission of electromagnetic radiation and more particularly to a novel transmitting assembly for electromagnetic radiation preferably in the actinic spectrum and method of manufacturing same.

BACKGROUND OF THE INVENTION

The use of image intensifiers has found many usages, including observations at low light levels, e.g. at night, or to create a visible image from electromagnetic radiation invisible to the human eye. An image intensifier tube is generally comprised of a sealed cylindrical enevelope having its one end closed by an entry window on the inner surface of which a photo-sensitive, electron emitting layer in electrical contact with, and enclosed by, a substantially circular, electrically conductive rim. The outer end of the cylindrical envelope is closed by an exit window on which an anode in the form of a phosphor screen is deposited. Means is provided for focussing a beam of electrons released from the photosensitive, electron emitting layer by incident radiation and comprising at least a cathode flange mounted around the substantially circular electrically conductive rim. The cathode flange is sealed by fritting to the entry window and is electrically connected to an electrically conductive, cylindrical member constituting part of the envelope. The image intensifier further comprised a source of voltage located outside the envelope having its positive terminal connected to the anode to supply voltages to the anode and a focussing means. An electric field formed within the enevelope focusses the beam of electrons released from the photosensitive, electron emitting layer onto the anode of the image intensifier device.

OBJECT OF THE INVENTION

An object of the present invention is to provide a novel light amplifier.

Another object of the present invention is to provide a novel light amplifier obviating additional energy input.

Still another object of the present invention is to provide a novel light amplifier for enlarging images.

Yet another object of the present invention is to provide a novel light amplifier of improved lumins efficacy with reduced energy expenditure.

A further object of the present invention is to provide a novel light amplifier to permit lumination at a point remote from the light source.

A still further object of the present invention is to provide a novel light amplifier.

SUMMARY OF THE INVENTION

These and other objects of the present invention are achieved by a light transmitting assembly comprised of a screen assembly having a plurality of generally conically-shaped repeater orifices wherein an optical fiber of an optical fiber bundle is disposed within each repeater orifice and wherein the repeater orifices are enclosed with an optical fiber array disc and wherein the optical fiber bundle is positioned between the screen assembly and a frame member for displaying thereon electromagnetic radiation preferably in the actinic range.

BRIEF DESCRIPTION OF THE DRAWINGS

A better understanding of the present invention as well as additional objects and advantages thereof will become apparent, upon consideration of the detailed disclosure thereof, especially when taken with the accompanying drawings; wherein.

DETAILED DESCRIPTION OF THE DRAWINGS

Figure 1:
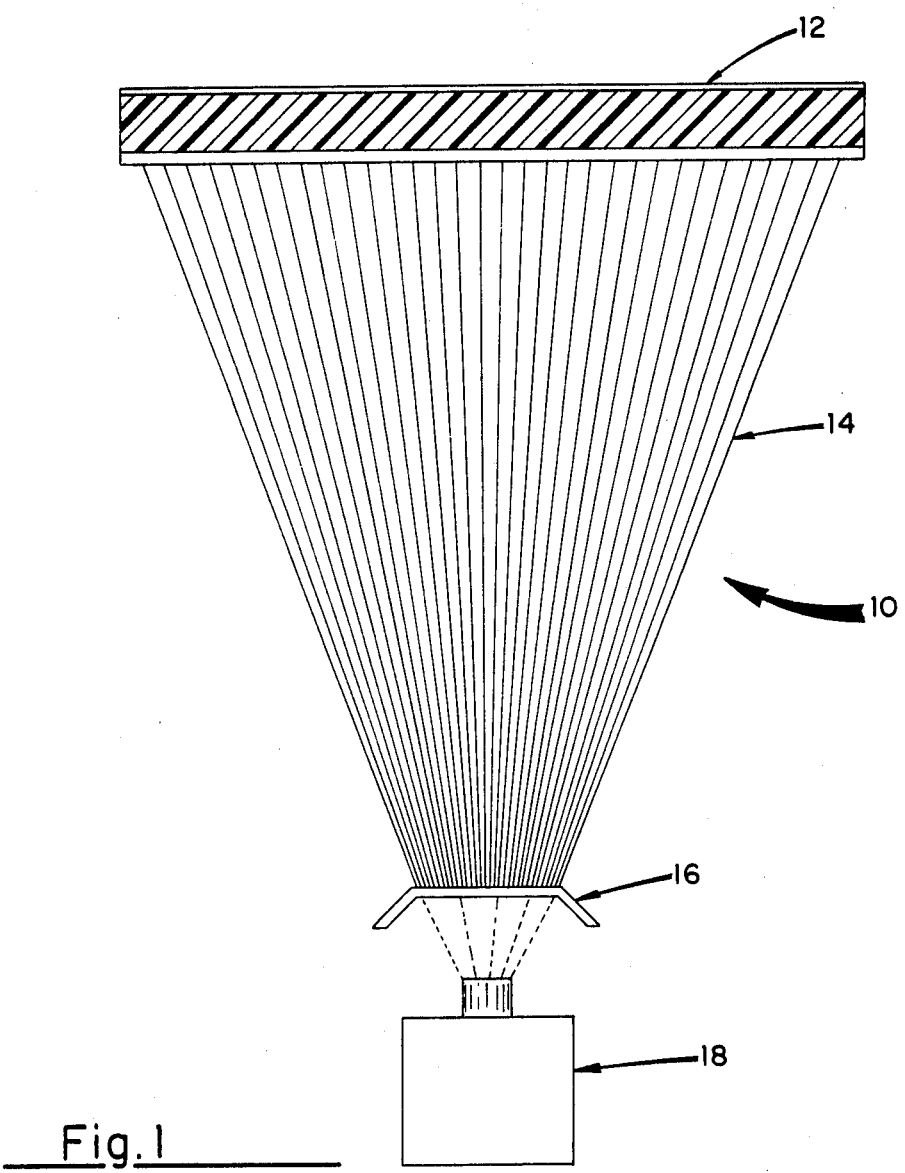
FIG. 1 is a schematic diagram of the novel light amplifier of the present invention.

Referring now to the drawings, and in particular FIG. 1, there is illustrated a novel light amplifier, generally indicated as 10, comprised of a screen assembly, an optical fiber bundle, a frame member and a light source, generally indicated as 12, 14, 16 and 18, respectively. The screen assembly 12 is formed of glass or a plastic material, such as polyethylene, polypropylene or the like, preferably a thermoplastic material responsive to ultrasonic radiation. The screen assembly 12 may be dimensioned to fit any desired broadcast system e.g. rectangular shape for viewing images, circular shape for replacement of a traffic signal lens, etc., as will become clear to one skilled in the art. Thus, a rectangular screen assembly 12 for enlarging images may range from 2 to 3 inches in width and height to as large as 40 to 50 feet, or greater. The thickness of the screen assembly 12 generally ranges from 50 mm to 16 inches, with preferable thickness being determined by end usage and processing requirements, as more fully hereinafter discussed.

Figure 3:
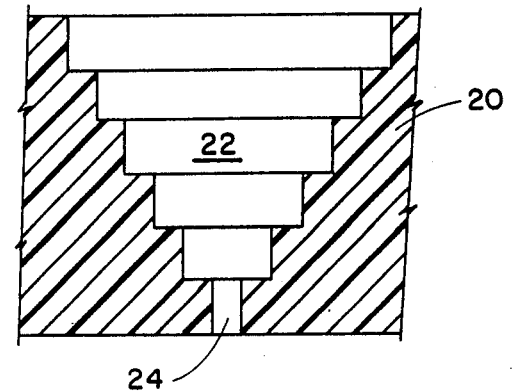
Figure 4:
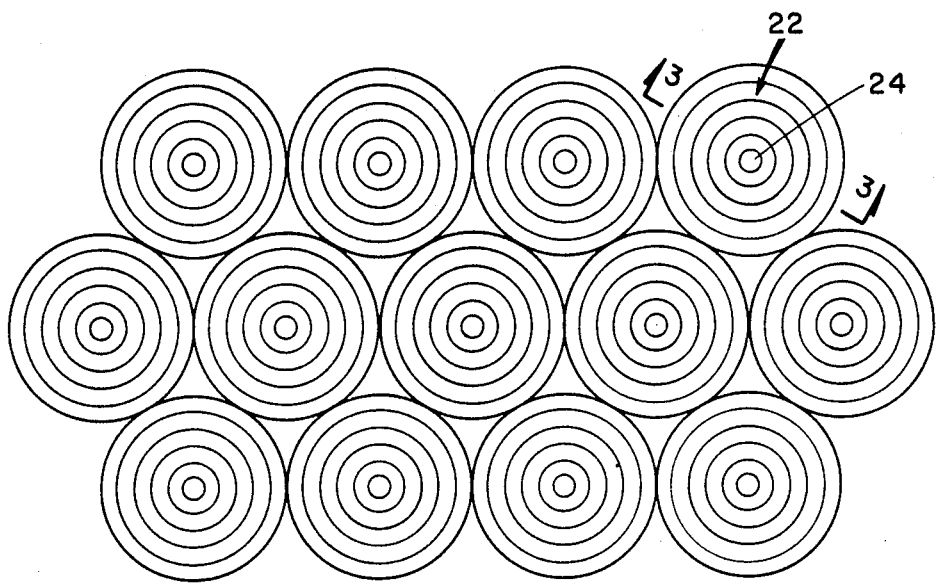
FIG. 4 is an enlarged cross-sectional view of a repeater orifice assembly.

To form the screen assembly 12, a screen substrate 20 of predetermined size and thickness is first subjected to an operation to form a plurality of conically-shaped orifices 22 of a diameter from 10 mm to 10 inches, referring particularly to FIGS. 3 to 4. In view of the size and shape of the orifices and subsequent processing considerations, it is generally desirable to form the orifices in lines and rows, although random orientation will achieve the same result. Each conically-shaped orifice 22 may be formed using laser techniques, such as a type of laser machine manufactured and sold by International Business Machine and utilizing laser vaporization techniques.

Figure 2:
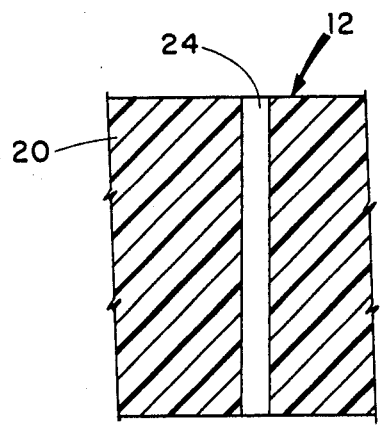
FIGS. 2 and 3 are enlarged cross-sectional schematic views of repeater orifice formation.

Accordingly, referring particularly to FIG. 2, the screen substrate 20 is subjected to initial laser fusion, drilling or casting to form cylindrically-shaped holes 24 through the screen substrate 20. Thereafter, laser fusion is effected about successively larger diameters increments of from 1 to 10 microns and in horizontal steps of from 1 to 10 microns to remove successively larger cylindrically-shaped portions of the screen substrate 20, referring particularly to FIG. 3 to eventually form the conically-shaped orifices 22 comprised of a plurality of stepped ledges. FIGS. 2 and 3 schematically illustrate formation of the stepped conically-shaped orifice 22, it being understood that such FIGS. 2 and 3 exaggerate stepping, and that in actuality successive laser radiation is effected at as hereinabove described increasing diameters and longitudinal levels of from 1 to 10 microns.

FIG. 4 is a front view of a portion of the screen substrate 20 after formation of the lines and rows of the orifices 22. Orifice density is in the range of from 50 to $10^{-2}$ orifices per square inch with orifice size being determined by screen assembly usage. Generally, the diameter of orifice at the light emitting surface of the screen assembly 12 will not be greater than about 10 times the diameter of the initial hole 24 or of the optical fiber 26.

Once the plurality of orifices has been formed in the screen substrate 20, the surfaces of the orifices 22 are coated with a light reflecting material, such as aluminum, silver, gold or the like material, using for example, vapor deposition techniques or the like. Thereafter, respective optical fibers 26, referring to FIG. 5, of the optical fiber bundle 14 are inserted into each hole 24 in a base portion of the orifice 22 in the substrate 20 and is connected therein, such as by plastic adhesives, electromagnetic radiation, heat or the like technique to insure totality of sealed integrity.

Such process is repeated until all of the optical fibers 26 constituting the optical fiber bundle 14 are inserted into respective holes 24 of the plurality of conically-shaped orifices 22. It will be appreciated by one skilled in the art that for light amplification, per se, random orientation of the optical fibers 25 within the screen assembly 12 with regard to the frame 16 is permissible, whereas for image amplication or reproduction that the optical fibers 26 of the optical fiber bundle 14 should be aligned or oriented with respective lines and rows of the optical fibers 26 in the frame member 16.

After connection of the optical fibers 26 into the plurality of conically-shaped orifices 22, the conically-shaped orifices 22 are filled with a liquid medium, such as distilled water or the like. The liquid medium may be any clear liquid exhibiting the desired refractive indexes to insure sharply defined light impulses.

Figure 5:
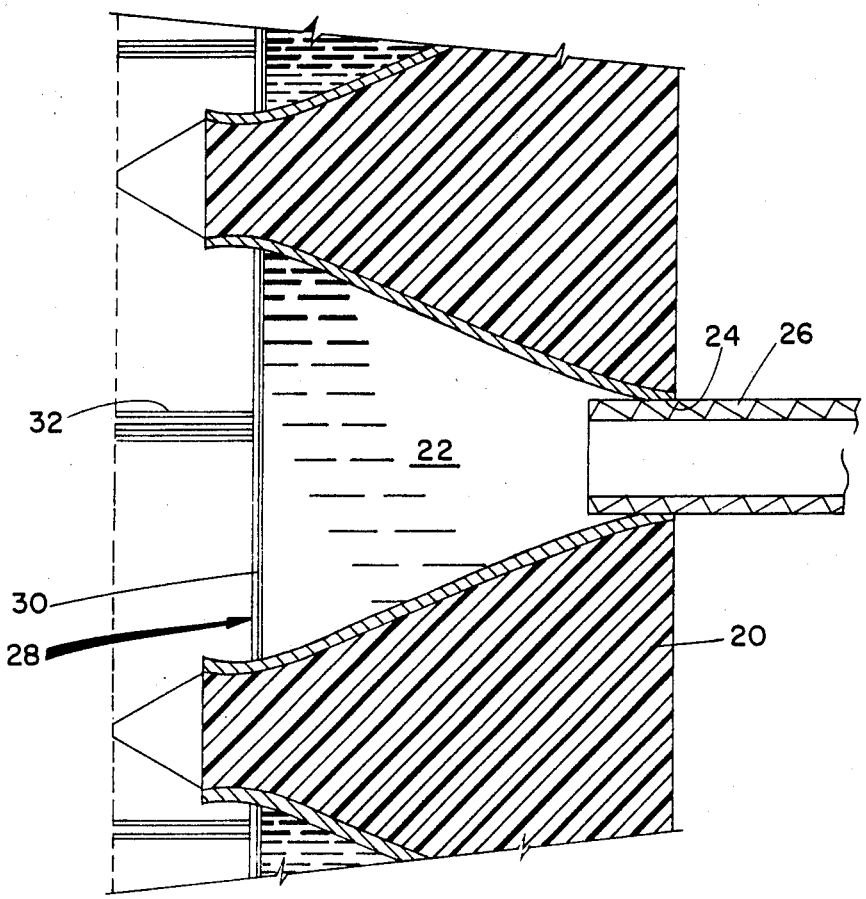
FIG. 5 is a partial end view, somewhat enlarged of the screen assembly.

Once the orifices 24 are filled with the liquid medium, the orifices 22 are enclosed by an optical fiber array disc 28, referring to FIG. 5, fitted and sealed within the orifices 22, such as by a liquid resin, again in a manner to insure sealed integrity thereby forming repeater orifices or members. Other techniques for sealing the optical fiber array disc 28 within each orifice 22 may be used. The optical fiber array disc 28 is essentially an optical fiber bundle comprised of a base portion 30 and a plurality of outwardly extending optical fibers 32 of a diameter of from 10 to 20 microns. The diameter of the optical fiber array disc 28 is determined by a largest diameter of the conically-shape orifice 22 together with an appropriate adhesive to contain the liquid medium therein.

The optical fibers 26 forming the optical fibers bundle 14 are generally of the multimode light guide type comprised of a core surrounded by a cladding of a lower refractive index material. Typically, cores of such multimode light guides are of a diameter of from 100 $\mu$m to 0.5 inches with a cladding of from 1 to 2 mm. Since such light guides are capable of light transmission for great distances, the length of the optical fiber bundle 14 may easily be selected with regard to location of the source of light and the specific application. The ends of the optical fibers 26 opposite the ends positioned in the screen substrate 20 are disposed in the frame number 16 with ends thereof polished in a manner known to one skilled in the art.

Figures 6, 7:
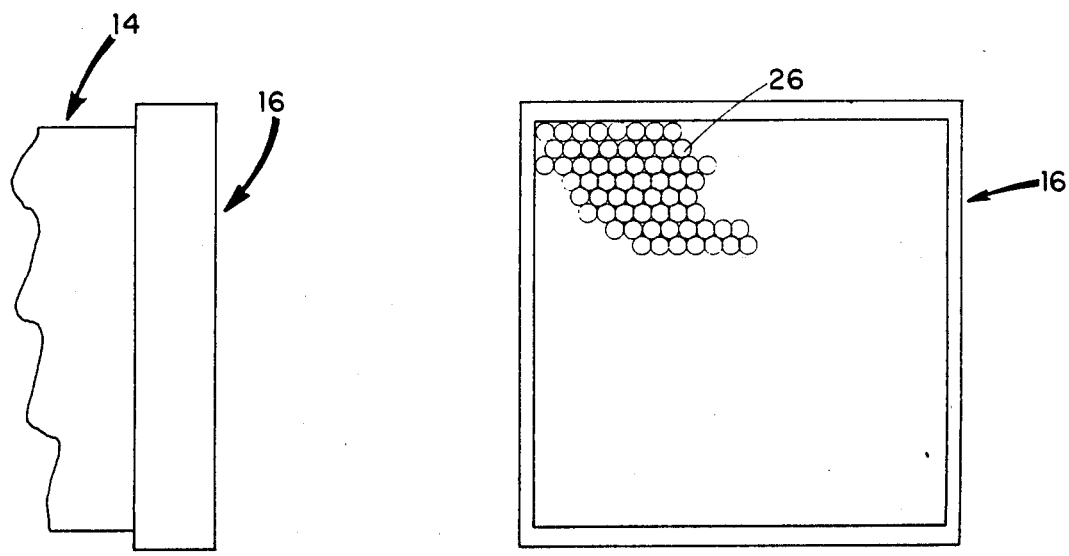
FIG. 6 is a side view of the frame member.
FIG. 7 is an end view of the frame member.

FIGS. 6 and 7 illustrate the frame member 16 of the optical fiber bundles 14 in the form of a rectangle. It will be understood that the screen assembly as well as the optical fiber frame member 16 may be circular, elliptical, etc. For light amplification, the screen assembly 12 and optical fiber frame member 16 need not be of like geometric configuration. Similarly, while the repeater orifices 22 are disclosed as being conically-shaped and formed of a plurality of concentrically-formed steps, the repeater orifices may take other geometric forms, such as that of a hexagon, square, etc. For image reproduction, each optical fiber 26 disposed in the frame member 16 is aligned within lines and rows of respective orifices 22 in the screen assembly 12, such that the lines and rows of the optical fibers 26 in the frame member 16 correspond to like lines and rows of optical fibers placement in the screen assembly 12.

The light image member 18 may be a slide projector, or movie projector, a light bulb, or like light and/or image source.

What is claimed:

1. A novel light transmitting assembly comprised of:
   a frame member for receiving projected visible electromagnetic radiation,
   a screen member formed with a plurality of repeater orifices and having a light emitting side,
   optical discs enclosing said repeater orifices on said light emitting side of said screen member; and
   an optical fiber bundle comprised of a plurality of optical fibers, an end of said optical fiber bundle being disposed in said frame member, another end of said optical fiber bundle being disposed within said screen member whereby optical fibers of said optical fiber bundle are fixedly disposed within said repeater orifices.

2. The novel light transmitting assembly as defined in claim 1 wherein said plurality of repeater orifices are conically-shaped orifices formed in said screen member extending toward said light emitting side of said screen member.

3. The novel light transmitting assembly as defined in claim 2 wherein each of said conically-shaped orifices is coated with a reflective material.

4. The novel light transmitting assembly as defined in claim 3 wherein each of said optical discs is an optical fiber array.

5. The novel light transmitting assembly as defined in claim 4 wherein a liquid medium is disposed with said repeater orifices.

6. The novel light transmitting assembly as defined in claim 5 wherein said liquid medium is water.

7. The novel light transmitting assembly as defined in claim 5 wherein said screen member is of a width dimension of from 3 inches to 50 feet and a height dimension of from 2 inches to 40 feet.

8. The novel light transmitting assembly as defined in claim 5 wherein said optical fibers of said optical fiber bundle are of a diameter of from 100 $\mu$m to 0.5 inches.

9. The novel light transmitting assembly as defined in claim 5 wherein repeater orifice density is from 50 to $10^{-2}$ repeater orifices per square inch.

10. The novel light transmitting assembly as defined in claim 5 further including a light source for effecting a light display on said frame member.

11. The novel light transmitting assembly as defined in claim 1 wherein said optical fibers of said optical fiber bundle are aligned in respective lines and rows in said frame member and said screen member.

12. A method of forming a screen assembly, which comprises:
    (a) forming a plurality of conically-shaped orifices in a screen substrate;
    (b) coating said conically-shaped orifices with a light reflective material;
    (c) affixing an optical fiber of an optical fiber bundle into a base portion of each of said conically-shaped orifices; and
    (d) affixing a fiber array disc into a top portion of each of said conically-shaped orifices.

13. The method as defined in claim 12 wherein a liquid medium is disposed within each of said conically-shaped orifices before step (d).

14. The method as defined in claim 13 wherein said screen substrate is of a thickness of from 50 mm to 16 inches.

15. The method as defined in claim 13 wherein said screen substrate is of a width dimension of from 3 inches to 50 feet and a height dimension of from 2 inches to 40 feet.

16. The method as defined in claim 13 wherein orifice density is of from 50 to $10^{-2}$ orifices per square inch.

17. The method defined in claim 13 wherein said liquid is water.

* * * * *